United States Patent

Hiwatashi

[11] Patent Number: 5,562,982
[45] Date of Patent: Oct. 8, 1996

[54] MAGNETIC RECORDING MEDIUM

[75] Inventor: Tatsuya Hiwatashi, Kikuchi-gun, Japan

[73] Assignee: Matsushita Electric Industrial Co., Ltd., Japan

[21] Appl. No.: 124,859

[22] Filed: Sep. 22, 1993

[30] Foreign Application Priority Data

Sep. 30, 1992 [JP] Japan .................................... 4-261148

[51] Int. Cl.$^6$ .................................. G11B 5/66; B32B 5/16
[52] U.S. Cl. ........................ 428/332; 428/336; 428/408; 428/446; 428/684 TS; 428/694 TP; 428/694 TC; 428/900
[58] Field of Search ..................... 428/684 TS, 684 TP, 428/684 TC, 408, 446, 332, 336, 900

[56] References Cited

U.S. PATENT DOCUMENTS

| | | | |
|---|---|---|---|
| 4,749,608 | 6/1988 | Nakayama | 428/216 |
| 4,892,789 | 1/1990 | Nakayama | 428/336 |
| 5,030,494 | 7/1991 | Ahlert | 478/65.5 |
| 5,045,165 | 9/1991 | Yamashita | 204/192.16 |
| 5,266,409 | 11/1993 | Schmidt | 428/446 |
| 5,275,850 | 1/1994 | Kitoh | 427/577 |
| 5,397,644 | 3/1995 | Yamashita | 428/408 |

FOREIGN PATENT DOCUMENTS 1-258218  10/1989  Japan .
1-273215  11/1989  Japan .

Primary Examiner—Leszek Kiliman
Attorney, Agent, or Firm—Rossi & Associates

[57] ABSTRACT

A magnetic recording medium comprises a substrate (1,2), a magnetic film layer (4), a buffer layer (5), and a hydrogen-containing carbon film layer (6). The buffer layer (5) is made of a material whose crystal structure is bcc-structure and atomic radius is equal to or larger than 0.122 nm, or is made of a material whose crystal structure is diamond structure. The hydrogen-containing carbon film layer (6) shows a Raman spectrum (8) having two peaks at wave numbers of approximately 1550 cm$^{-1}$ and 1350 cm$^{-1}$ in Raman spectroscopic analysis. This Raman spectrum (8) is expressed by combination of first and second Gaussian curves (9, 10) having respective peaks at wave numbers of approximately 1550 cm$^{-1}$ and 1350 cm$^{-1}$. And, an integrated intensity of the second Gaussian curve (10) having its peak at the wave-number of approximately 1350 cm$^{-1}$ is equal to or less than 3 times of an integrated intensity of the first Gaussian curve (9) having its peak at the wave number of approximately 1550 cm$^{-1}$.

5 Claims, 4 Drawing Sheets

MAGNETIC RECORDING MEDIUM

BACKGROUND OF THE INVENTION

1. Field of the Invention

The present invention relates generally to a magnetic recording medium used in a magnetic record/reproduction apparatus such as a magnetic disk drive.

2. Description of the Related Art

In a recent hard disk drive, high-density recording technology has been magnificently advanced. There are two keys for improvement of recording density. One is a floating technology of a magnetic head, and the other is development of a thin-film type head.

In order to establish above technologies, it is indispensable to improve antifriction property or abrasion resistance between the magnetic head and the magnetic recording medium (i.e. a magnetic disk).

So far, a generally utilized method for starting or stopping the hard disk drive is a contact-start-stop (abbreviated as CSS) method. This CSS method is characterized by forcing the magnetic head and the magnetic disk to contact with each other and cause a frictional slide engagement when the device starts or stops the operation.

In a hard disk drive using such a CSS method, chance to cause a frictional slide engagement between the magnetic head and the magnetic disk will increase with lowering floating height of the magnetic head. It is, therefore, doubtless that reducing a floating amount of the magnetic head necessitates improvement of antifriction property or abrasion resistance between the magnetic head and the magnetic disk.

Regarding the thin-film type head, $Al_2O_3TiC$ is generally known as a slider material thereof. $Al_2O_3TiC$ has an extremely high hardness compared with a ferrite material used in a conventional Winchester type head. This predicts that the improvement of antifriction property or abrasion resistance between the magnetic head and the magnetic disk will be also essential for the adoption of the thin-film type head having an extremely high hardness.

A development of a surface protecting film is one of earnestly studied measures for improving the antifriction property or abrasion resistance. Especially, carbon material is generally recognized as a prospective protecting film material.

An improvement of the carbon protecting film has been recently conducted by adding hydrogen in the carbon protecting film. However, addition of hydrogen is not always effective to improve antifriction property and abrasion resistance. For example, the property is unexpectedly deteriorated depending on the crystal structure of the hydrogen-containing carbon film layer.

Furthermore, the hydrogen-containing carbon film layer is found to be inferior to the conventional carbon film layer in the adhesive strength to the magnetic film layer.

The reason is that the hydrogen-containing carbon film layer is fundamentally different from the conventional carbon layer in their film properties. More specifically, the conventional carbon film layer has a crystal structure similar to graphite. On the other hand, the hydrogen-containing carbon film layer has a crystal structure similar to diamond. Raman spectrum makes the difference clear. A relative intensity of the Raman spectrum, which will be later explained in detail, normally becomes small when the substance has a crystal structure similar to diamond.

As the conventional carbon film layer has a graphite-like crystal structure, a magnetic film material of Co can freely diffuse into the carbon film layer. Thus, a sufficient adhesive strength is obtained on the surface between the magnetic film layer and the carbon film layer. On the contrary, the hydrogen-containing carbon film layer has a diamond-like crystal structure; therefore, the magnetic film material of Co cannot diffuse into the carbon film layer. This is why the hydrogen-containing carbon film layer has insufficient adhesive strength to the magnetic film layer.

The adhesive strength of the protecting film layer to the magnetic film layer is an important factor to improve the antifriction or abrasion resistance of the disk. If the adhesive strength to the magnetic film layer is weak or small, any excellent film layer will be peeled off by the sliding engagement of the magnetic head and may be fatally damaged as a result of peeling-off phenomenon.

Unexamined Japanese Patent Application No. 1-258218/1989 or Unexamined Japanese Patent Application No. 1-273215/1989 discloses a magnetic disk comprising a hydrogen-containing carbon film layer. These prior arts, however, fail to define an optimum range to improve antifriction property or abrasion resistance.

SUMMARY OF THE INVENTION

Accordingly, an object of the present invention is to define an optimum range to improve the antifriction property or abrasion resistance of the hydrogen-containing carbon film layer. Another object of the present invention is to improve adhesive strength between the hydrogen-containing carbon film layer and the magnetic film layer.

In order to accomplish the above purposes, a first aspect of the present invention provides a magnetic recording medium comprising: a substrate; a magnetic film layer provided on the substrate; and a carbon film layer provided on the magnetic film layer and containing a predetermined amount of hydrogen therein the carbon film layer showing Raman spectrum having two peaks at wave numbers of approximately 1550 $cm^{-1}$ and 1350 $cm^{-1}$ in Raman spectroscopic analysis the Raman spectrum being expressed by combination of first and second Gaussian curves having respective peaks at wave numbers of approximately 1550 $cm^{-1}$ and 1350 $cm^{-1}$, and an integrated intensity of the second Gaussian curve having its peak at the wave number of approximately 1350 $cm^-$ being equal to or less than 3 times of an integrated intensity of said first Gaussian curve having its peak at the wave number of approximately 1550 $cm^{-1}$.

Furthermore, a second aspect of the present invention provides a magnetic recording medium comprising: a substrate; a magnetic film layer provided on the substrate; a buffer layer provided on the magnetic film layer, said buffer layer comprising at least either a material whose crystal structure is bcc-structure and atomic radius is equal to or larger than 0.122 nm or a material whose crystal structure is diamond structure; and a carbon film layer provided on said buffer layer and containing a predetermined amount of hydrogen therein, the carbon film layer showing Raman spectrum having two peaks at wave numbers of approximately 1550 $cm^{-1}$ and 1350 $cm^{-1}$ in Raman spectroscopic analysis, the Raman spectrum being expressed by combination of first and second Gaussian curves having respective peaks at wave numbers of approximately 1550 $cm^{-1}$ and 1350 $cm^-$, and an integrated intensity of the second Gaussian curve having its peak at the wave number of approximately 1350 cm$^{-1}$ being equal to or less than 3 times of an integrated intensity of said first Gaussian curve having its peak at the wave number of approximately 1550 cm$^{-1}$.

Moreover, it is preferable that the hydrogen-containing carbon film layer has a film thickness of 20 to 25 nm, the magnetic film layer is made of Co-series magnetic material, and the substrate includes an aluminum base body and Ni-P film layer formed thereon.

Still further, it is preferable that the buffer layer includes a material selected from a group consisting of Cr, Mo, W, Si, and Nb.

The above and other objects, features and advantages of the present invention will become more apparent from the following detailed description which is to be read in conjunction with the accompanying drawings.

DETAILED DESCRIPTION OF THE PREFERRED EMBODIMENTS

Hereinafter, with reference to accompanying drawings, preferred embodiments of the present invention will be explained in detail.

Figure 1:
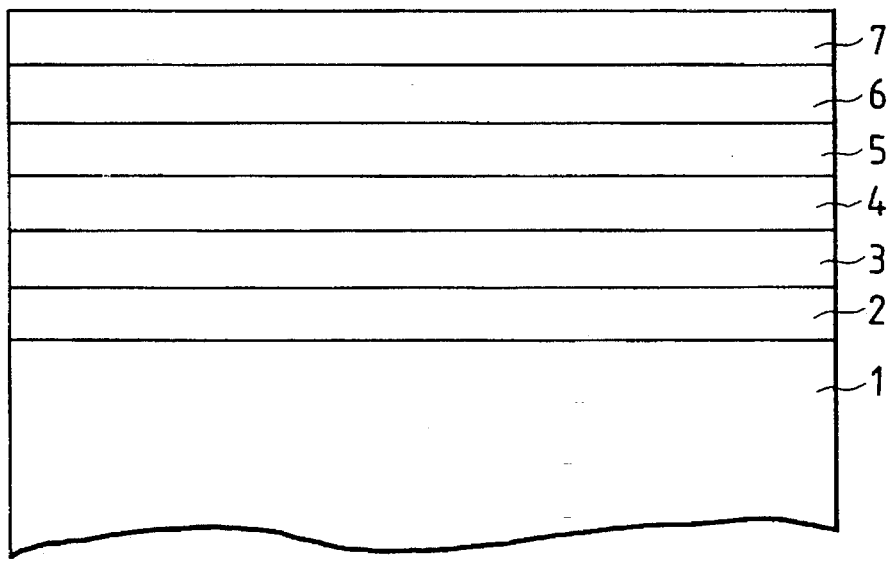
FIG. 1 is a cross-sectional view schematically showing a magnetic recording medium in accordance with one embodiment of the present invention.

FIG. 1 is a cross-sectional view showing a magnetic recording medium in accordance with one embodiment of the present invention. In FIG. 1, a disk-like base body 1 is made of, for example, aluminum. This base body 1 has a thickness of approximately 1.00 to 1.50 mm. A Ni-P film layer 2 is formed on the base body 1 through electrodeposition. The base body 1 and the Ni-P film layer 2 cooperatively constitute a substrate of the magnetic recording medium. The Ni-P film layer 2 has a film thickness of approximately 20 μm. Furthermore, texture fabrication is applied on the Ni-P film layer 2 so that scratches extending in the circumferential direction are formed thereon. A bed film layer 3 is formed on the Ni-P film layer 2. The bed film layer 3, whose material is Cr or the like, is deposited by sputtering or the like process to have a film thickness of approximately 100 nm.

A magnetic film layer 4, formed on the bed film layer 3, is made of Co-series magnetic material such as CoCrTa, CoNiCr, CoCrPt, CoNiPt, CoCrPtTa, and CoCrPtB. The magnetic film layer 4 is deposited by a sputtering or the like process to have a film thickness of 40 to 60 nm. A buffer layer 5 is formed on the magnetic film layer 4. The buffer layer made of a material whose crystal structure is bcc-structure and atomic radius is equal to or larger than 0.122 nm or a material whose crystal structure is diamond structure. More specifically, a material such as Cr, Mo, W, Si, and Nb is suitable for the buffer layer 5. The buffer layer 5 is deposited by sputtering or the like process to have a thickness of 10 to 20 nm. A carbon film layer 6 containing hydrogen (refer to as a hydrogen-containing carbon film layer, hereinafter) is formed on the buffer layer 5. This hydrogen-containing carbon film layer 6 is deposited by sputtering or the like process to have a film thickness of 20 to 25 nm. A lubrication film layer 7, which is made of a material containing polyether, is formed on the hydrogen-containing carbon film layer 6 to have a film thickness of 3 to 6 nm.

Figure 2:
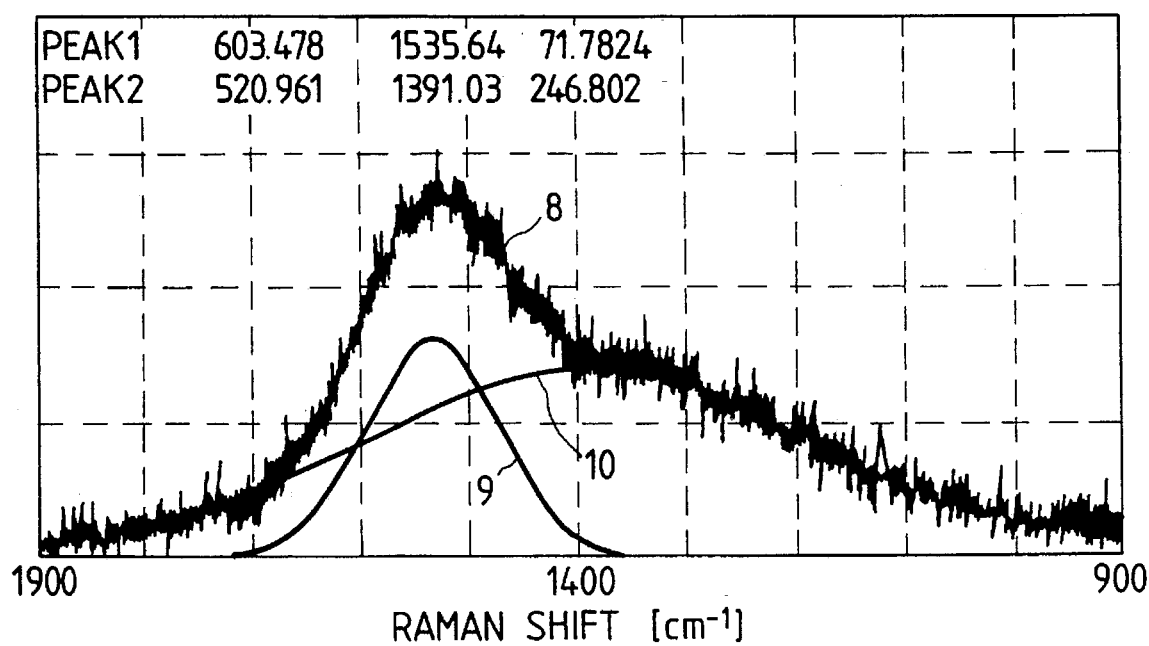
FIG. 2 is a graph showing a result of Raman spectroscopic analysis in which a carbon film layer containing hydrogen in accordance with the present invention is tested.

The hydrogen-containing carbon film layer 6 will be explained in more detail. FIG. 2 is a graph showing a result of Raman spectroscopic analysis of the hydrogen-containing carbon film layer 6, wherein an abscissa represents a wave number of Raman shift and the ordinate represents a peak intensity. A curve 8 is an actually measured Raman spectrum. This Raman spectrum 8 is expressed by combination of two Gaussian curves 9 and 10. A first Gaussian curve 9 has a peak at a wave number of approximately 1550 cm$^{-1}$. A second Gaussian curve 10 has a peak at a wave number of approximately 1350 cm$^{-1}$. Namely, the Raman spectrum 8 is identical with a composite curve of the first and second Gaussian curves 9 and 10.

An integrated intensity of the Gaussian curve is generally defined by an area between the Gaussian curve and the abscissa. In accordance with the present invention, the ratio of the integrated intensities of above two Gaussian curves 9 and 10 is strictly controlled. Because, the first Gaussian curve 9 directly corresponds to a carbon component whose bonding structure is three-dimensional. It is noted that the property of the film layer is improved with increasing percentage of this three-dimensional carbon component. Thus, the ratio of the integrated intensities of above two Gaussian curves 9 and 10 is suppressed within a predetermined range.

More specifically, in the hydrogen-containing carbon film layer 6 of the present invention, the integrated intensity of the second Gaussian curve 10 having its peak at the wave number of approximately 1350 cm$^{-1}$ is equal to or less than 3 times of the integrated intensity of the first Gaussian curve 9 having its peak at the wave number of approximately 1550 cm$^{-1}$. In other words, the hydrogen-containing carbon film layer 6 has the relative intensity of 3 or less.

Next, the buffer layer 5 will be explained.

The reason why the material having bcc-crystal structure is used as the buffer layer 5 is as follows. If the buffer layer 5 is made of the material having bcc-crystal structure, a carbon atom of the hydrogen-containing carbon film layer 6 can diffuse into the buffer layer 5. That is, the carbon diffuses to an octahedron or tetrahedron position between lattices of the buffer layer 5. Thus, a strong adhesive strength can be obtained on the surface between the buffer layer 5 and the hydrogen-containing film layer 6.

Furthermore, the reason why the atomic radius of the above material is selected to be equal to or larger than 0.122 nm is as follows. In order to allow the diffusion atom to diffuse through a gap between lattices of the host atom, it is generally known that the atomic radius of the diffusion atom must be equal to or less than 59% of the atomic radius of the host atom. As the diffusion atom, i.e. carbon atom, has an atomic radius of 0.072 nm, the minimum atomic radius of the above material constituting the buffer layer 5 becomes 0.122 nm.

Furthermore, as described previously, the buffer layer 5 can be constituted by the material having diamond crystal structure. The reason why the diamond crystal structure is preferable is as follows. The diamond crystal structure allows the carbon atom to diffuse into the buffer layer 5 causing lattice defect or atomic replacement in the buffer layer 5. Therefore, a strong adhesive strength can be obtained on the surface between the buffer layer 5 and the hydrogen-containing film layer 6.

Next, a sputtering device for forming the hydrogen-containing carbon film layer 6 and others will be explained.

Figure 6:
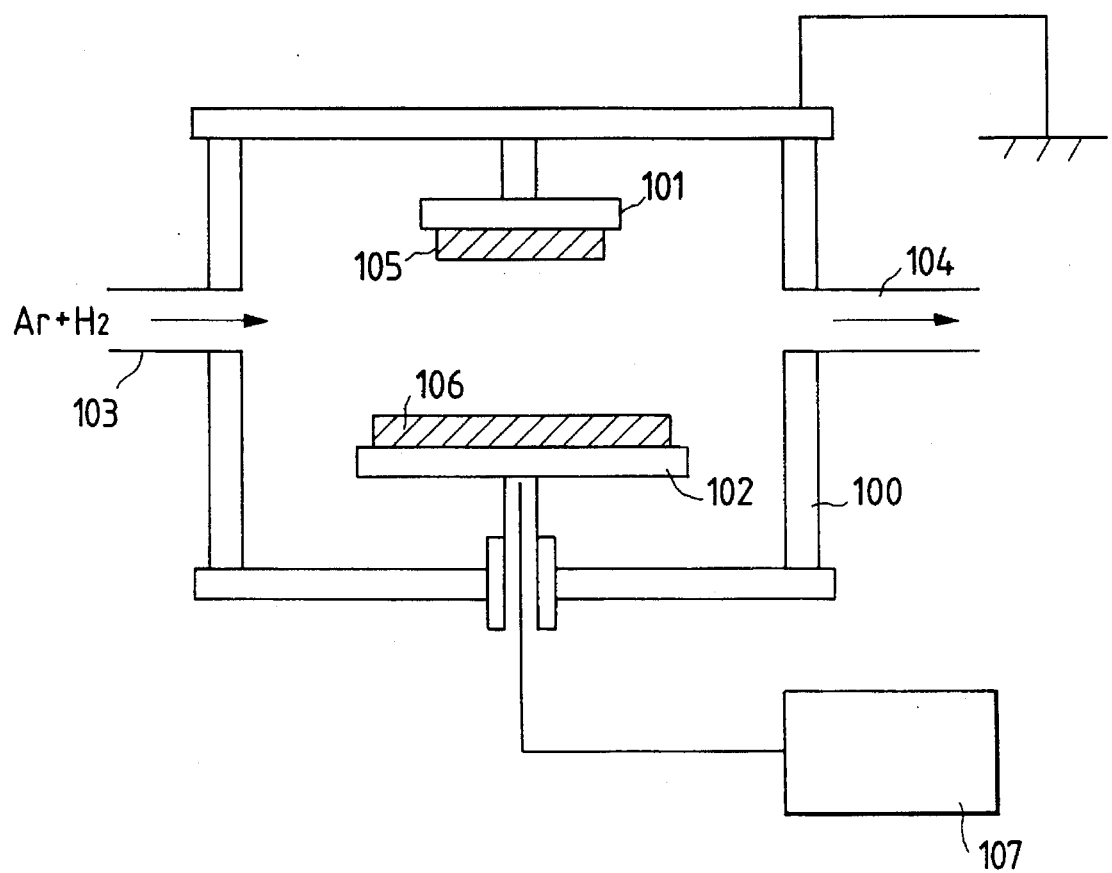
FIG. 6 is a schematic view showing a sputtering device used in this embodiment.

FIG. 6 is a schematic view showing a DC magnetron sputtering device. In FIG. 6, a reference numeral 100 represents a chamber, in which a pair of confronting electrodes 101 and 102 are housed. The chamber 100 is provided with a gas intake hole 103 and a gas exhaust hole 104. The gas intake hole 103 introduces a gas mixture of Ar and $H_2$. The gas exhaust hole 104 is connected to a vacuum chamber. Furthermore, the chamber 100 is grounded to the earth. A substrate 105 is mounted on the electrode 101, while a target 106 is mounted on the electrode 102. Moreover, the electrode 102 is connected to a high-frequency power supply source 107.

An operation of the above-described apparatus will be explained below with reference to the formation of the hydrogen-containing carbon film layer 6. The substrate 105 is a prepared substrate which has already been formed with the buffer layer 5 thereon. The target 106 is a carbon plate. First of all, the gas mixture of Ar and $H_2$ is introduced from the gas intake hole 103 into the chamber 100 by a predetermined flow rate. Meanwhile, gases in the chamber 100 is scavenged through the gas exhaust hole 104. By adjusting the flow amount of the gas mixture introduced from the gas intake hole 103 and the scavenged gas amount sucked from the gas exhaust hole 104, a sputtering gas pressure in the chamber 100 is controlled to be a predetermined value. This adjustment is essential to control hydrogen amount to be contained in the carbon film layer. In other words, the relative intensity of the hydrogen-containing carbon film layer is controlled by the adjustment of the sputtering gas mixture.

After finishing adjustment of the gas mixture, the D.C. power supply source 107 is activated to apply a predetermined voltage between electrodes 101 and 102, so as to form the hydrogen-containing carbon film layer 6 on the substrate 105.

Although the substrate of the present embodiment is constituted by the aluminum base body 1 with the Ni-P film layer 2 formed thereon, this substrate can be also constituted by any of a carbon substrate, a reinforced glass substrate, and a NiP/AlMg substrate. In the case where the carbon substrate or the reinforced glass substrate is used, it will be preferable to form a Ni-P film layer on the substrate in accordance with the property requirement of the magnetic disk.

Furthermore, a size of the substrate will be designed to be any of 5.25, 3.5, 2.5, and 1.89 inches.

A wrapping tape or the like will be used for the texture fabrication of the carbon substrate. Moreover, diamond powder as well as the wrapping tape will be used for the texture fabrication of the glass substrate. Furthermore, chemical etching may be adopted.

Although the present embodiment provides the bed film layer 3 for improving the property of the magnetic film 4, this bed film layer 3 can be removed as occasion demands. Although the present embodiment forms the bed film layer 3 by Cr, this can be replaced by a Ni-P film layer deposited by sputtering.

Although the present embodiment forms the magnetic film layer 4 by the Co-series magnetic material, other material such as chromium oxide series or iron carbide nitride compound series can be used for the magnetic film layer 4.

Although the present embodiment forms the hydrogen-containing carbon film layer 6 uniformly in its hydrogen concentration, it will be, also preferable to locally increase the hydrogen concentration with reducing a distance to the surface thereof. As already explained, the hydrogen concentration can be controlled by changing density of the sputtering gas mixture. Furthermore, it will be also preferable to form this carbon film layer 6 into two-layer structure. In this case, one layer will be formed on the magnetic film layer 4 by performing sputtering by use of Ar gas only, so as to form a pure carbon film layer containing no hydrogen. Thereafter, the other layer will be formed on this pure carbon film layer so as to form a hydrogen-containing carbon film layer.

According to the above-described magnetic recording medium, several samples were manufactured on an experimental basis.

1 Embodiment

This #1 embodiment forms the buffer layer 5 on the magnetic film layer 4. Then, the hydrogen-containing carbon film layer 6 is formed on the buffer layer 5. In this #1 embodiment, the buffer layer 5 is constituted by chromium (Cr) whose crystal structure is bcc-structure and atomic radius is 0.125 nm. The growth or deposition of the hydrogen-containing carbon film layer 6 on the buffer layer 5 is conducted by the use of the sputtering gas mixture of Ar and $H_2$ in accordance with the DC magnetron spattering method. Gas flow amount ratio of Ar and $H_2$ is selected to be 5:1 in the sputtering operation. An overall gas pressure is in a range of 1–10 mTorr. And, an applied electric power is 500 W.

2 Embodiment

This #2 embodiment forms the buffer layer 5 on the magnetic film layer 4. Then, the hydrogen-containing carbon film layer 6 is formed on the buffer layer 5. In this #2 embodiment, the buffer layer 5 is constituted by molybdenum (Mo) whose crystal structure is bcc-structure and atomic radius is 0.136 nm. The growth or deposition of the hydrogen-containing carbon film layer 6 on the buffer layer 5 is conducted by the use of the sputtering gas mixture of Ar and $H_2$ in accordance with the DC magnetron sputtering method. Gas flow amount ratio of Ar and $H_2$ is selected to be 5:1 in the sputtering operation. An overall gas pressure is in a range of 1–10 mTorr. And, an applied electric power is 500 W.

3 Embodiment

This #3 embodiment forms the buffer layer 5 on the magnetic film layer 4. Then, the hydrogen-containing carbon film layer 6 is formed on the buffer layer 5. In this #3 embodiment, the buffer layer 5 is constituted by tungsten (W) whose crystal structure is bcc-structure and atomic radius is 0.137 nm. The growth or deposition of the hydrogen-containing carbon film layer 6 on the buffer layer 5 is conducted by the use of the sputtering gas mixture of Ar and $H_2$ in accordance with the DC magnetron sputtering method. Gas flow amount ratio of Ar and $H_2$ is selected to be 5:1 in the sputtering operation. An overall gas pressure is in a range of 1–10 mTorr. And, an applied electric power is 500 W.

#4 Embodiment

This #4 embodiment forms the buffer layer 5 on the magnetic film layer 4. Then, the hydrogen-containing carbon film layer 6 is formed on the buffer layer 5. In this #4 embodiment, the buffer layer 5 is constituted by silicon (Si) whose crystal structure is diamond-structure. The growth or deposition of the hydrogen-containing carbon film layer 6 on the buffer layer 5 is conducted by the use of the sputtering gas mixture of Ar and $H_2$ in accordance with the DC magnetron sputtering method. Gas flow amount ratio of Ar and $H_2$ is selected to be 5:1 in the sputtering operation. An overall gas pressure is in a range of 1–10 mTorr. And, an applied electric power is 500 W.

#1 Comparative Example

This #1 comparative example forms the hydrogen-containing carbon film layer directly on the magnetic film layer. The growth or deposition of the hydrogen-containing carbon film layer on the magnetic film layer is conducted by the use of the sputtering gas mixture of Ar and $H_2$ in accordance with the DC magnetron sputtering method. Gas flow amount ratio of Ar and $H_2$ is selected to be 5:1 in the sputtering operation. An overall gas pressure is in a range of 1–10 mTorr. And, an applied electric power is 500 W.

FIG. 2 shows the result of the Raman spectroscopic analysis, which is common to the hydrogen-containing carbon film layers in accordance with the above #1–#4 embodiment and #1 comparative example. According to the result of FIG. 2, the relative intensity of the hydrogen-containing carbon film layers was 2.43. Namely, an area (integrated intensity) enclosed by the second Gaussian curve 10 and the abscissa is 2.43 times as large as an area (integrated intensity) enclosed by the first Gaussian curve 9 and the abscissa. For conducting this Raman spectroscopic analysis, RAMANOR U-1000, manufactured by JOBIN YVON, was used in these embodiments as an appropriate Raman spectroscopic analyzer.

#5 Embodiment

This #5 embodiment forms the buffer layer 5 on the magnetic film layer 4. Then, the hydrogen-containing carbon film layer 6 is formed on the buffer layer 5. In this #5 embodiment, the buffer layer 5 is constituted by chromium (Cr) whose crystal structure is bcc-structure and atomic radius is 0.125 nm. The growth or deposition of the hydrogen-containing carbon film layer 6 on the buffer layer 5 is conducted by the use of the sputtering gas mixture of Ar and $H_2$ in accordance with the DC magnetron sputtering method. Gas flow amount ratio of Ar and $H_2$ is selected to be 10:1 in the sputtering operation. An overall gas pressure is in a range of 1–10 mTorr. And, an applied electric power is 500 W.

According to this #5 embodiment, the relative intensity of the hydrogen-containing carbon film layer was 2.95.

#2 Comparative Embodiment

This #2 comparative example forms the buffer layer 5 on the magnetic film layer 4. Then, the hydrogen-containing carbon film layer 6 is formed on the buffer layer 5. In this #2 comparative example, the buffer layer 5 is constituted by chromium (Cr) whose crystal structure is bcc-structure and atomic radius is 0.125 nm. The growth or deposition of the hydrogen-containing carbon film layer 6 on the buffer layer 5 is conducted by the use of the sputtering gas mixture of Ar and $H_2$ in accordance with the DC magnetron sputtering method. Gas flow amount ratio of Ar and $H_2$ is selected to be 20:1 in the sputtering operation. An overall gas pressure is in a range of 1–10 mTorr. And, an applied electric power is 500 W.

According to this #2 comparative example, the relative intensity of the hydrogen-containing carbon film layer was 3.14.

#1 Prior Art Example

This #1 prior art example forms a pure carbon film layer directly on the magnetic film layer. The growth or deposition of the pure carbon film layer on the magnetic film layer is conducted by the use of Ar gas only in accordance with the DC magnetron sputtering method. This is a conventional method for forming a carbon protecting film layer.

Figure 3:
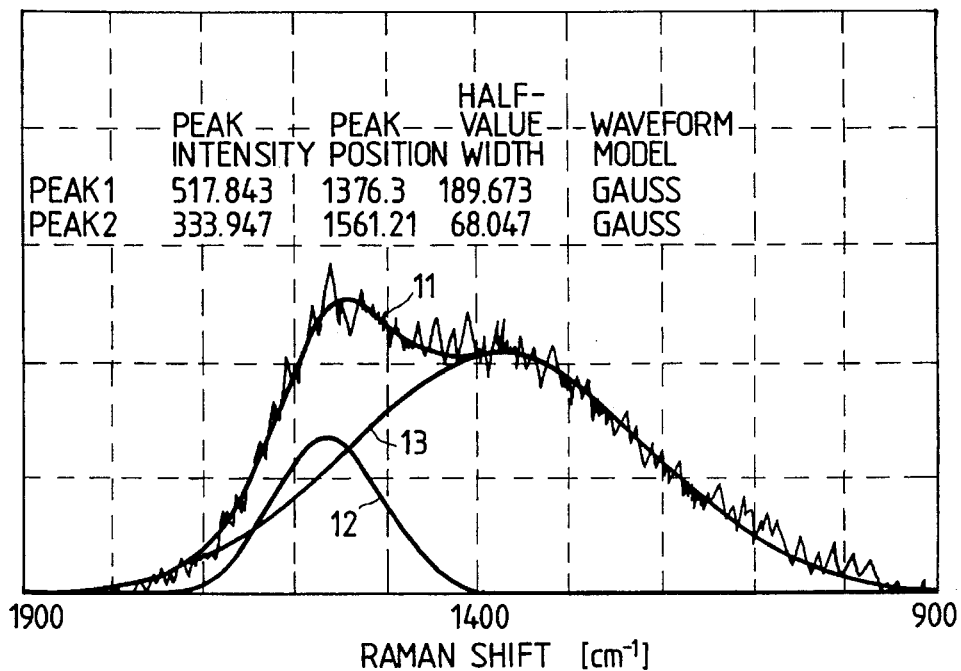
FIG. 3 is a graph showing a result of Raman spectroscopic analysis in which a conventional carbon film layer is tested.

FIG. 3 shows the result of the Raman spectroscopic analysis of the carbon film layer in accordance with the #1 prior art example. According to the result of FIG. 3, the relative intensity of the conventional carbon film layer was 4.12. In FIG. 3, an abscissa represents a wave number of Raman shift and an ordinate represents a peak intensity. A curve 11 is an actually measured Raman spectrum. This Raman spectrum 11 is expressed by combination of two Gaussian curves 12 and 13.

Next, properties of the carbon film layers will be discussed with respect to above #1–#5 embodiments, #1–#2 comparative examples, and #1 prior art example. By the way, formation of the lubrication film layer 7 is omitted in above experiments.

First of all, adhesive strength of the hydrogen-containing film layer to the substrate will be explained. In the tests of adhesive strength of the film layer, a scanning-type SCRATCH TESTER SST 101, manufactured by SHIMADZU, was used to measure a peeling load of the film. Measurement conditions for the pealing load tests are as follows.

Figure 4:
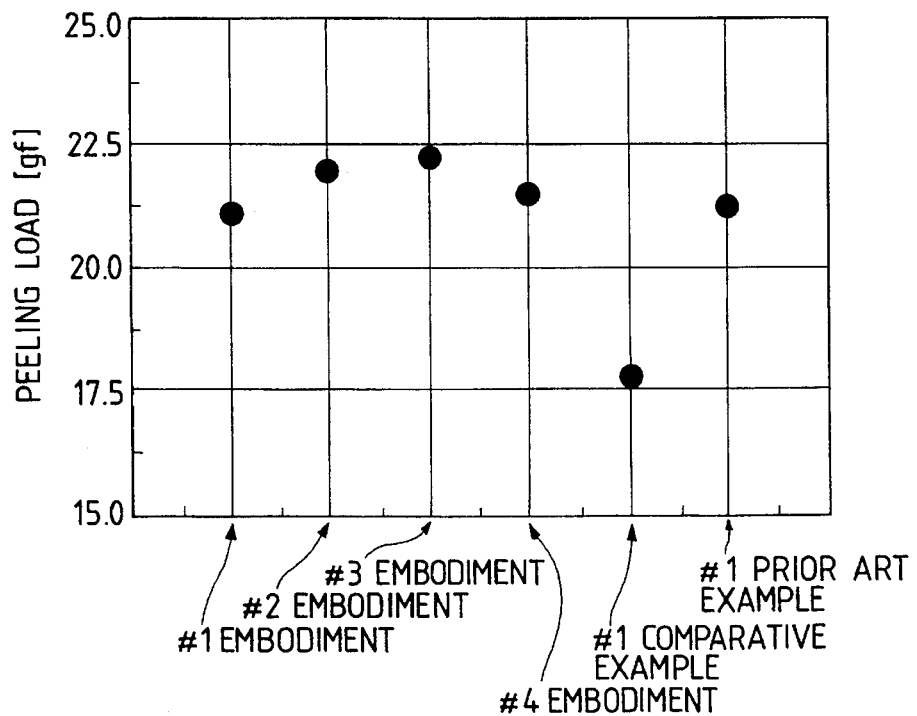
FIG. 4 is a graph showing test results of adhesive strength.

* Curvature of a contact needle - - - 15 μm
* Scratch speed - - - 20 μm/s
* Amplitude - - - 50 μm
* Pressing speed of the contact needle - - - 1 μm/s FIG. 4 shows the result of the peeling load tests conducted. As apparent from FIG. 4, the #1 prior art example having the relative intensity of 4.12 shows a strong adhesive strength between the carbon film layer and the magnetic film layer. On the other hand, the #1 comparative example having the relative intensity of 2.43 shows a weak adhesive strength between the hydrogen-containing film layer and the magnetic film layer. Furthermore, the #1–#4 embodiments having formed the buffer layer between the hydrogen-containing film layer and the magnetic film layer show strong adhesive strengths equivalent to that of the #1 prior art example. In this manner, the adhesive strength can be remarkably increased by providing the buffer layer between the hydrogen-containing carbon film layer and the magnetic film layer.

Next, antifriction property or abrasion resistance will be explained. For checking the antifriction property or abrasion resistance, the contact-start-stop (abbreviated as CSS) test has been conducted. Table 1 shows the test conditions.

TABLE 1

| HEAD | THIN FILM TYPE (Al$_2$O$_3$TiC) |
|---|---|
| HEAD LOAD | 9.5 gf |
| HEAD FLOATING AMOUNT | 0.1 μm |
| CSS CYCLE | on: 5 sec<br>off: 10 sec |
| RADIUS | 30.0 mm |
| LUBRICATION | NO LUBRICATION |

Figure 5:
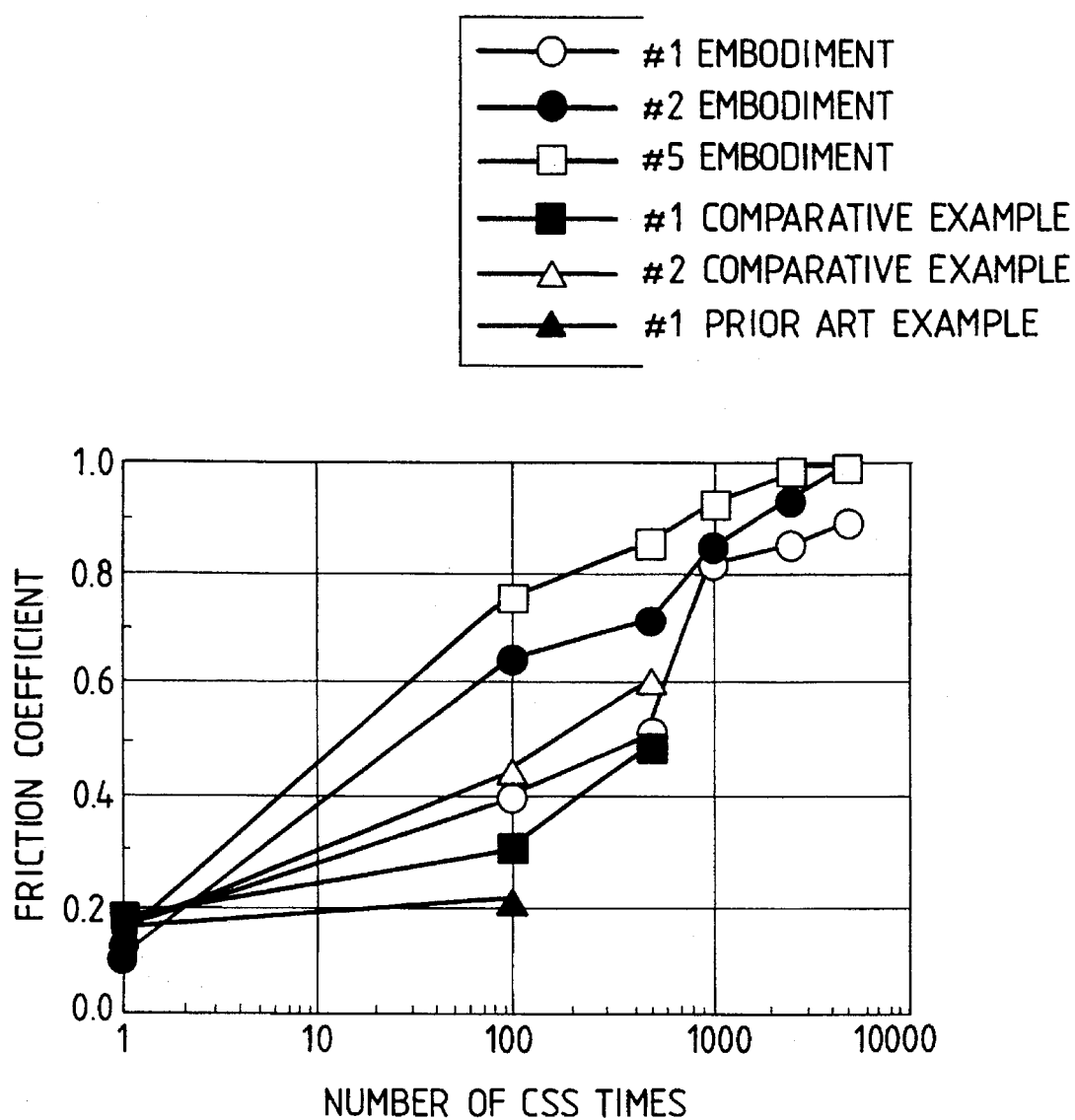
FIG. 5 is a graph showing results of CSS tests.

FIG. 5 shows the result of the CSS tests conducted, wherein an abscissa represents the number of CSS times, i.e. frequency or repetition number of CSS motions, and an ordinate represents a friction coefficient between the magnetic head and the magnetic disk. As a result of these CSS tests, it is found that the #1 prior art example caused a crush after approximately 100 times CSS motions due to wear of the carbon film layer. In the same way, the #1 comparative example has caused a crush after approximately 500 times CSS motions due to peeling-off of the hydrogen-containing carbon film layer, since the adhesive strength of the hydrogen-containing carbon film layer onto the magnetic film layer is weak as explained in the foregoing description.

On the contrary, the #1, #2, and #5 examples show excellent CSS test results. Any of these three examples shows no damage in the observation of the surface on the hydrogen-containing carbon film layer even after finishing the CSS tests. Although not shown in FIG. 5, the #3 and #4, examples showed the similar excellent results.

The #2 comparative example, whose relative intensity is 3.14, has caused a crush due to wear. In view of the crush result of the #2 comparative example, it is concluded that the relative intensity of the hydrogen-containing carbon film layer should be suppressed within a range of 3 or less.

As described in the foregoing description, the adhesive strength of the hydrogen-containing carbon film layer to the magnetic film layer can be increased by forming the buffer layer between the magnetic film layer and the hydrogen-containing carbon layer. Furthermore, the antifriction property or abrasion resistance can be improved by setting the relative intensity of the hydrogen-containing carbon film layer to be equal to or less than 3. Thus, the present invention can provide a disk protecting film having excellent properties.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds are therefore intended to embraced by the claims.

What is claimed is:

1. A magnetic recording medium comprising:

a substrate;

a magnetic film layer provided on said substrate;

a buffer layer provided on said magnetic film layer, said buffer layer comprising least either a first material whose having a bcc-crystal structure and an atomic radius not less than 0.122 nm, or a second material having a diamond crystal structure;

a carbon film layer provided on said buffer, layer, said carbon film layer containing hydrogen;

said carbon film layer showing a Raman spectrum having two peaks at wave numbers of approximately 1550 cm$^{-1}$ and 1350 cm$^{-1}$ provided by Raman spectroscopic analysis, said Raman spectrum being expressed by combination of first and second Gaussian curves having respective peaks at wave numbers 1550 cm$^{-1}$ and 1350 cm$^{-1}$, and an integrated intensity of said second Gaussian curve being not greater than 3 times an integrated intensity of said first Gaussian curve;

wherein said buffer layer includes a material selected from a group consisting of Cr, Mo, W, Si, and Nb.

2. A magnetic recording medium comprising:

a substrate;

a magnetic film layer provided on said substrate;

a buffer layer provided on said magnetic film layer, said buffer layer comprising at least either a first material whose having a bcc-crystal structure and an atomic radius not less than 0.122 nm, or a second material having a diamond crystal structure;

a carbon film layer provided on said buffer layer, said carbon film layer containing hydrogen;

said carbon film layer showing a Raman spectrum having two peaks at wave numbers of approximately 1550 cm$^{-1}$ and 1350 cm$^{-1}$ provided by Raman spectroscopic analysis, said Raman spectrum being expressed by combination of first and second Gaussian curves having respective peaks at wave numbers 1550 cm$^{-1}$ and 1350 cm$^{-1}$, and an integrated intensity of said second Gaussian curve being not greater than 3 times an integrated intensity of said first Gaussian curve.

3. A magnetic recording medium in accordance with claim 2, wherein said carbon film layer has a film thickness of 20 to 25 nm.

4. A magnetic recording medium in accordance with claim 2, wherein said magnetic film layer is comprised of Co-series magnetic material.

5. A magnetic recording medium in accordance with claim 2, wherein said substrate includes an aluminum base body and Ni-P film layer formed thereon.

* * * * *